March 23, 1943.  P. KLAMP  2,314,622
BEARING MOUNTING
Filed March 21, 1942  3 Sheets-Sheet 2

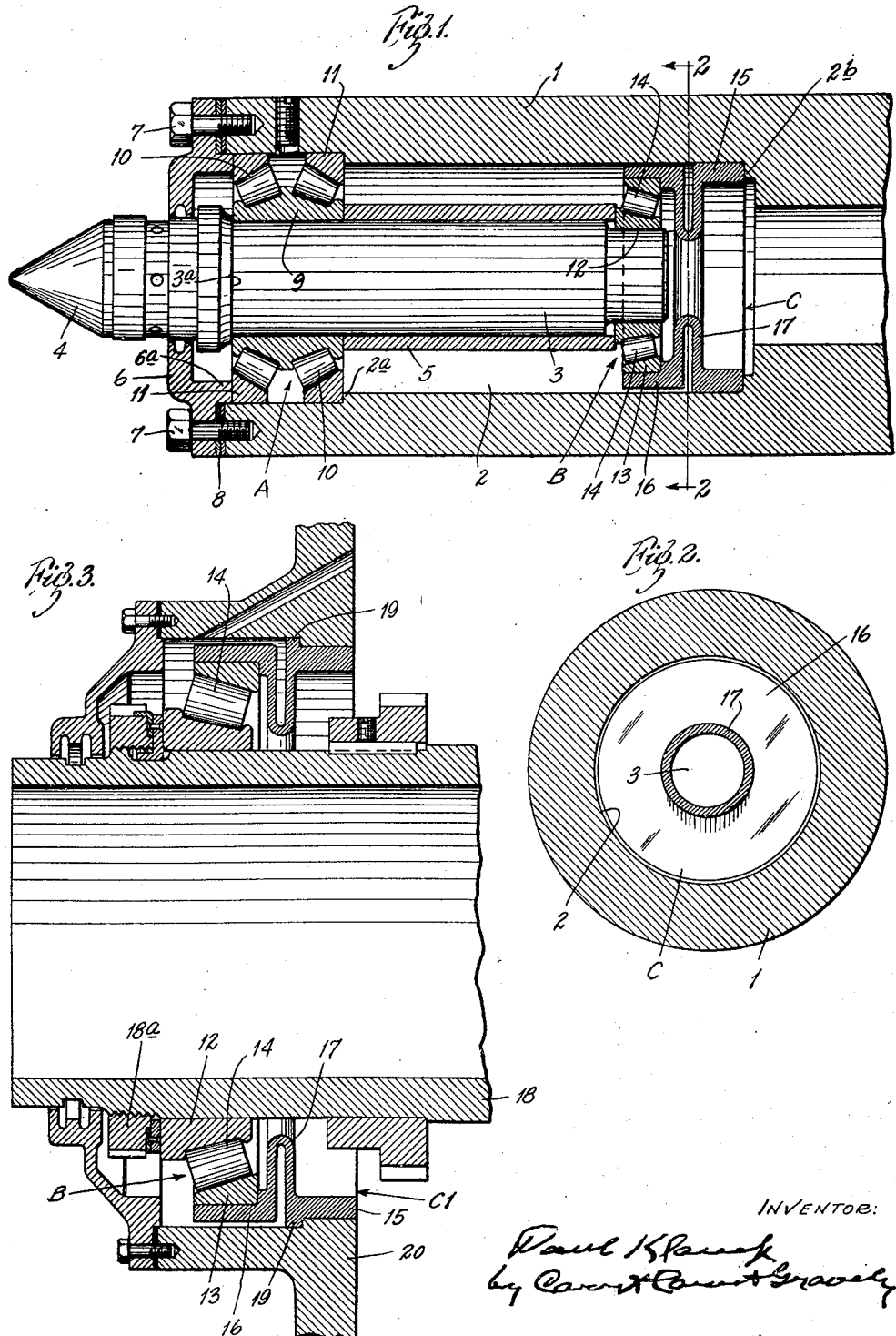

INVENTOR:
Paul Klamp
by Carr & Carr Gravely
HIS ATTORNEYS

March 23, 1943.  P. KLAMP  2,314,622
BEARING MOUNTING
Filed March 21, 1942  3 Sheets-Sheet 3
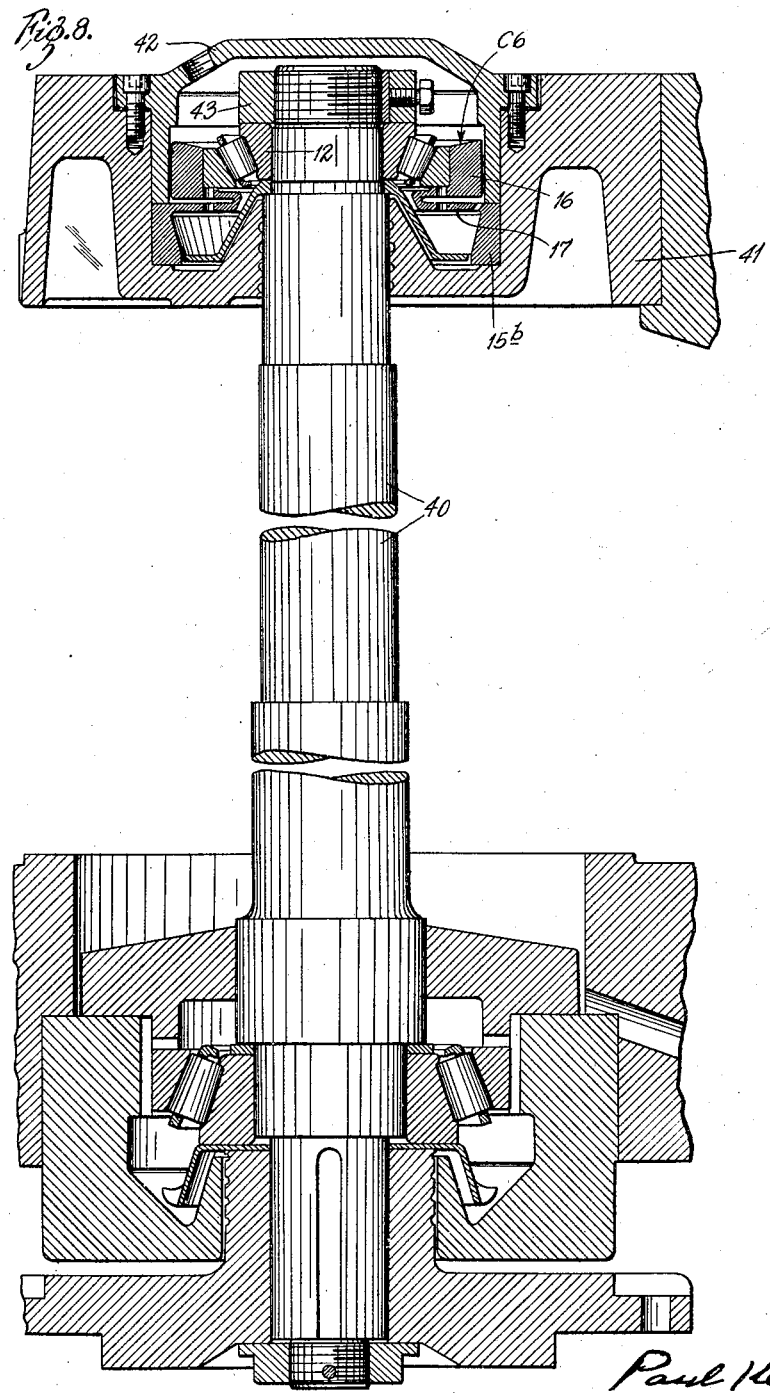
INVENTOR:
Paul Klamp
HIS ATTORNEYS.

Patented Mar. 23, 1943

2,314,622

UNITED STATES PATENT OFFICE 2,314,622

BEARING MOUNTING

Paul Klamp, Canton, Ohio, assignor to The Timken Roller Bearing Company, Canton, Ohio, a corporation of Ohio Application March 21, 1942, Serial No. 435,627

19 Claims. (Cl. 308—207)

This invention relates to bearing mountings, particularly preloaded rotary antifriction shaft bearing mountings. The principal object of the present invention is to devise a simple and economical bearing mounting of the above type which will provide for adjusting the bearing preload, which is automatically adjustable to compensate for flexure and axial displacement of the shaft and to take up wear in the bearing, and which will provide free axial movement of the bearing without requiring a free fit of the raceway supporting member in the mounting. The invention consists principally in providing a sleeve with one end portion rigid with the mounting, with the other end portion free of said mounting and constituting a seat for one of the raceway members of the bearing, and with an axially resilient end intermediate portion adapted to preload the bearing and to compensate for flexure and axial displacement of the shaft supported in said bearing. The invention also consists in the means for preloading the resilient intermediate portion of said sleeve; and it also consists in the parts and combinations and arrangement of parts hereinafter described and claimed.

Figure 4:
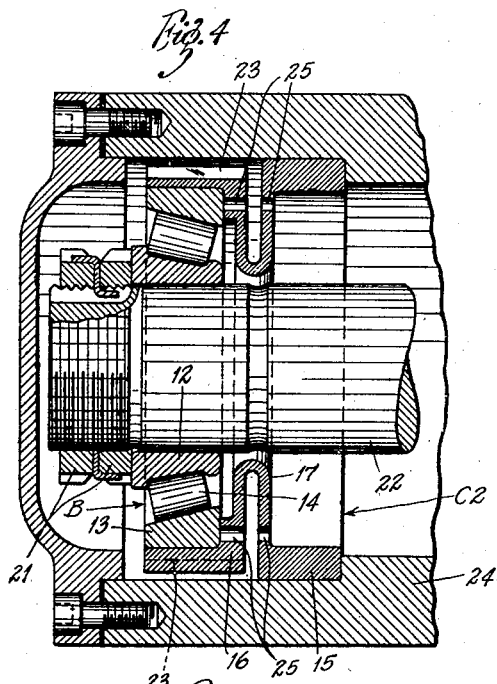
Figure 5:
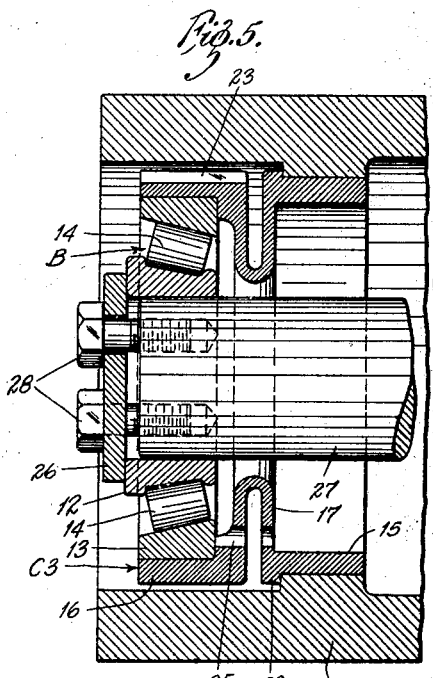
Figure 6:
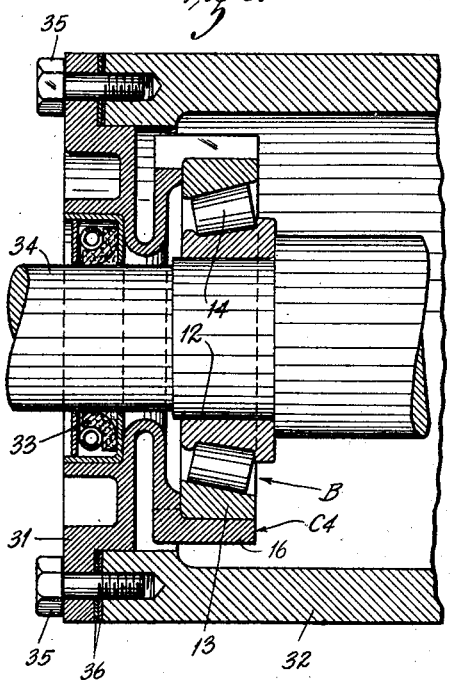
Figure 7:
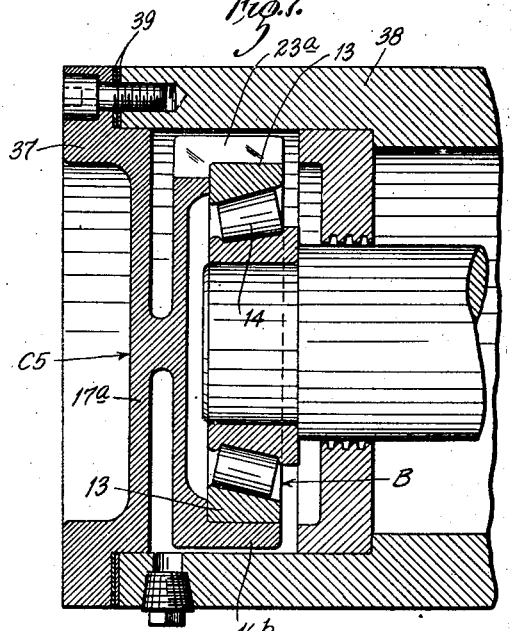

In the accompanying drawings which form part of this specification and wherein like symbols refer to like parts wherever they occur, Fig. 1 is a central longitudinal section through a tail stock center provided with a preloaded bearing mounting embodying my invention, Fig. 2 is a transverse section on the line 2—2 in Fig. 1, Fig. 3 is a fragmentary central longitudinal section through a turret lathe spindle provided with a preloaded bearing mounting embodying my invention, Fig. 4 is a central longitudinal section through a bearing mounting wherein the bearing is preloaded through the inner raceway member, Figs. 5, 6 and 7 are views similar to Fig. 4, showing three modified forms of preloaded bearing mountings; and Fig. 8 is a central vertical longitudinal section showing my invention embodied in the upper bearing of a vertical grinding spindle.

In the construction shown in Figs. 1 and 2 of the accompanying drawings, my invention is shown embodied in a roller bearing tail stock center mounting comprising a housing or casing 1 having a bore 2 extending therethrough; a spindle 3 disposed in said bore and terminating beyond the end thereof in a tapered head 4; a double row taper roller bearing A for supporting said spindle in said bore near one end thereof; a single row taper roller bearing B for supporting the inner end of said spindle in said bore; a spacing sleeve 5 mounted on said spindle between said bearings; an annular closure member 6 for the annular space between said spindle and housing at said end of said bore; cap screws 7 for securing said end closure to said housing; and shims 8 clamped between the opposing ends of said closure and housing. The double row bearing A preferably comprises a double inner raceway member or cone 9 mounted on the spindle 3 between a shoulder 3a thereon and the adjacent end of the spacing sleeve 5, two series of conical antifriction elements or rollers 10, and a separate cup or outer raceway member 11 for each series of rollers mounted in the bore 2 of the housing 1. As shown in Fig. 1, the end closure 6 has an inwardly extending annular flange 6a on the inner end thereof that abuts against the outermost cup of the bearing A and serves to seat the innermost cup against an annular shoulder 2a provided therefor in the bore 2, thereby preventing axial movement of said bearing relative to the housing 1 and spindle 3. The single row bearing B for supporting the inner end of the spindle 3 comprises an inner raceway member or cone 12 pressfitted on said spindle in endwise abutting relation to the inner end of the spacing sleeve 5, an outer raceway member or cup 13, and a series of conical antifriction elements or rollers 14 interposed between said cup and cone.

According to the present invention, the single row bearing B is supported in a carrier in the form of a one-piece metallic sleeve C having an inner end portion 15 pressfitted or otherwise fixed in the bore 2 of the housing 1 in abutting relation to an annular stop shoulder 2b provided therefor in said bore, an outer end portion 16 that is clear of said bore and an intermediate inwardly extending open accordion fold or return bend portion 17 forming a radially stiff but axially resilient connection between said end portion of said tubular carrier. As shown in the drawings, the cup 13 of the single tail bearing B is pressfitted or otherwise fixed in the free outer end portion 16 of the carrier C; and the resilient fold 17 of said carrier is compressed axially to preload both bearings by the end pressure transmitted to said fold by the annular end closure flange 6a through the bearing A, sleeve 5 and bearing B.

By the arrangement described, the desired preload of the bearing A is obtained by varying the number of shims 8 between the end closure 6 and the housing 1, while the desired preload of the bearing B is obtained by proper choice of the length of the spacing sleeve 5. The flexibility of the accordion fold 17 of the carrier C compensates for flexure, misalinement or axial displacement of the spindle or shaft 3, while the bearing preload is maintained and wear of the bearings taken up by the tendency for said fold to return to the normal, unstressed condition. The folded portion 17 of the carrier C has sufficient radial stiffness to resist lateral displacement of the tail bearing B in the bore 2 of the housing 1. The foregoing construction also provides free axial resiliency without the necessity for a floating fit of the cup 13 in the carrier C or the carrier 2 in the bore of the housing 1; and the rear bearing B carries a share of the thrust load equal to the preload, whereby the load capacity is increased. The carrier C is preferably made from heat-treated carbon or alloy steel and is finished machined after heat treatment, the strength and resiliency of the carrier being determined by test.

Fig. 3 shows a roller bearing machine tool spindle mounting, wherein the single row bearing B is substituted for the two floating bearings ordinarily required for supporting the tail end of the machine tool spindle 18. In this construction, the single tail bearing B is mounted in a cup carrier C1 similar to that shown in Fig. 1. The carrier of Fig. 3, however, has an external rib 19 that abuts against a shoulder in the bore of the support 20; and the bearing is preloaded by an end thrust transmitted to the accordion fold 17 of said carrier by means of a nut 18a threaded on said spindle in endwise abutting relation to the cone 12 thereon.

In the bearing mounting shown in Fig. 4, the preload on the bearing B is adjusted by means of nuts 21 threaded on the shaft 22 in abutting relation to the outer end of the cone 12 of said bearing. In this construction, the outer cup supporting portion 16 of the carrier C2 has a series of circumferentially spaced longitudinal grooves 23 in the outer periphery thereof through which pins may be inserted for pressing the inner end portion of the carrier into its seat in the bore of the housing 24. The accordion fold carrier has a series of circumferentially spaced holes 25 extending through the two folds thereof opposite the cup 13, whereby said cup may be removed from said carrier by pins inserted through these openings.

In the construction shown in Fig. 5, the preload is adjusted by means of a plate 26 that is pressed against the outer end of the cone or inner raceway member 12 of the supporting bearing for said shaft 27 by means of cap screws 28 that extend through openings in said plate with their heads in abutting relation to the outer face of said plate and with their shank portions threaded into the adjacent end of said shaft. In this construction, the inner end of the cup carrier C3 is provided adjacent to the innermost wall of the accordion fold with an external peripheral flange 29 that abuts endwise against an annular shoulder provided therefor in the bore of the housing 30. This construction permits through boring of the carrier seat.

Fig. 6 shows a bearing mounting wherein the preload is applied through the cup or outer raceway member 13 of the bearing B, and the cup carrier C4 has its outer end portion located outwardly of said bearing to form an end closure 31 for the housing 32 and to provide a seat for an oil seal 33 that surrounds the shaft 34. In this construction, the carrier is secured to the end of the housing 32 by means of cap screws 35, and the preload of the bearing is controlled by means of shims 36 interposed between said cup carrier and housing.

In the construction shown in Fig. 7, the cup carrier C5 forms an end closure 37 for the housing 38, and the preload is adjusted by means of shims 39 interposed between the end of the housing and the closure portion of said carrier. In this construction, the radial depth of the accordion fold 17a of the carrier is increased, thus providing maximum axial flexibility and free self-alining; and the cup supporting portion 16b of the carrier has one or more notches 23a in the outer periphery thereof whereby the cup 13 of the bearing B may be forced out of the carrier by means of pins inserted in said notches.

Fig. 8 shows an application of the flexible cup carrier C6 to the upper bearing of a vertical grinding spindle 40. In this construction, the inner or lower end 15b of the cup carrier held in the bore provided therefor in the bearing housing 41 by means of the end closure 42 for said housing, and preload of the bearing is controlled by means of a nut 43 threaded on the upper end of the spindle 40 in endwise abutting relation to the cone or inner raceway member 12 of the bearing. This preloaded bearing construction is more simple and compact and requires fewer parts than the preloaded bearing constructions heretofore used with vertical grinder spindles.

Obviously, the hereinbefore described invention is applicable to other bearing applications and is not limited to taper roller bearings, the invention being adapted for preloading angular ball bearings and for automatically taking up the end play due to wear and expansion and contraction of parts. The bearing carrier may also be used for supporting the inner raceway member of the bearing instead of the outer raceway member thereof, and the bearing may be preloaded by applying axial pressure to either the inner or outer raceway member of the bearing.

What I claim is:

1. A bearing mounting comprising relatively rotatable inner and outer members, a rotary antifriction bearing interposed between said members, and a carrier for said bearing having a portion rigid with one of said members, a portion supporting said bearing, and a portion connecting said first and second portions, said connecting portion being yieldable with said bearing longitudinally of the axis of rotation of the bearing and relatively stiff in directions transverse to said axis.

2. A bearing mounting comprising relatively rotatable inner and outer members, a rotary antifriction bearing interposed between said members, and a carrier for said bearing having end portions spaced apart axially of said bearing, one rigid with one of said members and the other supporting said bearing, and an axially resilient radially stiff intermediate portion connecting said axially spaced end portions 3. A bearing mounting comprising relatively rotatable inner and outer members, a rotary antifriction bearing interposed between said members, a one-piece carrier for said bearing having a portion rigid with one of said members, a portion constituting a seat for said bearing, and a resilient portion connecting said first and second mentioned portions for relative movement in the direction of the bearing axis, and means for compressing said resilient portion in the direction of such axis to preload said bearing.

4. A bearing mounting comprising relatively rotatable inner and outer members, a rotary antifriction bearing interposed between said members, a one-piece carrier for said bearing disposed between said members, said carrier having a portion rigid with one of said members, and a portion clear of said member and constituting a seat for said bearing, and a portion connecting said first and second mentioned portions, said last mentioned portion being resilient in the direction of the bearing axis and relatively stiff in directions transverse thereto, and manually adjustable means for compressing said resilient portion in the direction of such axis to thereby preload said bearing.

5. A bearing mounting comprising relatively rotatable inner and outer members, a rotary antifriction bearing interposed between said members, and a supporting sleeve disposed between and axially of said members, said sleeve having axially spaced end portions, one rigid with one of said members and the other free of said member, and an intermediate portion that is yieldable longitudinally of the axis of rotation of said bearing and relatively stiff radially of said axis, said bearing comprising inner and outer raceway elements and antifriction elements disposed therebetween, one of said raceway elements being sustained by the free end of said sleeve.

6. A bearing mounting comprising relatively rotatable inner and outer members, a rotary antifriction bearing interposed between said members, and a supporting sleeve disposed between said members longitudinally of the axis of rotation of said bearing, said sleeve having axially spaced end portions, one rigid with one of said members and the other end free of said member, and an intermediate portion that is resilient in the direction of said axis and relatively stiff radially thereof, said bearing comprising inner and outer raceway members and antifriction elements disposed therebetween, said outer raceway member being rigid with the free end of said sleeve.

7. A bearing mounting comprising relatively rotatable inner and outer members, a rotary antifriction bearing interposed between said members, and a supporting sleeve disposed between said members longitudinally of the axis of rotation of said bearing, said sleeve having an end rigid with one of said members, an end free of said member, and an intermediate portion that is resilient in the direction of said axis and relatively stiff radially thereof, said bearing comprising inner and outer raceway members and antifriction elements disposed therebetween, said outer raceway member being rigid with the free end of said sleeve, and means for compressing said resilient intermediate portion in the direction of said bearing axis to preload said bearing axially.

8. A bearing mounting comprising relatively rotatable inner and outer members, a rotary antifriction bearing interposed between said members, said bearing comprising inner and outer raceway members and antifriction elements disposed therebetween, and a carrier for said bearing having a portion rigid with one of said members, and a portion that supports said outer raceway member and is yieldable therewith longitudinally of the axis of rotation of said bearing and relatively stiff radially of said axis.

9. A bearing mounting comprising relatively rotatable inner and outer members, a rotary antifriction bearing interposed between said members, said bearing comprising inner and outer raceway members and antifriction elements disposed therebetween, and a carrier for said bearing having a portion rigid with one of said members and a portion supporting said outer raceway member of said bearing and resiliently connected to said first mentioned portion for movement relative thereto longitudinally of the axis of rotation of said bearing, and means for compressing the resilient connection between said portion of said carrier lengthwise of said axis to axially preload said bearing.

10. A bearing mounting comprising relatively rotatable inner and outer members, a rotary antifriction bearing interposed between said members, said bearing comprising inner and outer raceway members and antifriction elements disposed therebetween, and a carrier for said bearing having a portion rigid with one of said members and a portion supporting said outer raceway member of said bearing and resiliently connected to said first mentioned portion for movement relative thereto longitudinally of the axis of rotation of said bearing, and means for compressing the resilient connection between said portion of said carrier lengthwise of said axis to axially preload said bearing, said compressive force being transmitted to said resilient connection through the inner raceway member of said bearing.

11. A bearing mounting comprising relatively rotatable inner and outer members, a rotary antifriction bearing interposed between said members, said bearing comprising inner and outer raceway members and antifriction elements disposed therebetween, and a carrier for said bearing having a portion rigid with one of said members and a portion supporting said outer raceway member of said bearing and resiliently connected to said first mentioned portion for movement relative thereto longitudinally of the axis of rotation of said bearing, and means for compressing the resilient connection between said portion of said carrier lengthwise of said axis to axially preload said bearing, said compressive force being transmitted to said resilient connection through the outer raceway member of said bearing.

12. A bearing mounting comprising relatively rotatable inner and outer members, a rotary antifriction bearing interposed between said members, and a carrier for said bearing having a portion rigid with one of said members and a portion supporting said bearing and resiliently connected to said first mentioned portion for movement relative thereto lengthwise of the bearing axis, said first mentioned portion of said carrier being shaped and arranged to form an end closure for said outer member.

13. A bearing mounting comprising relatively rotatable inner and outer members, a rotary antifriction bearing interposed between said members, and a carrier for said bearing having a portion rigid with one of said members, and a portion supporting said bearing, and resiliently connected to said first mentioned portion for movement relative thereto lengthwise of the bearing axis, and an oil seal supported in said first mentioned portion of said carrier and cooperating with said inner member, said first mentioned portion of said carrier and said oil seal forming an end closure for the annular space between said relatively rotatable inner and outer members.

14. A bearing mounting comprising relatively rotatable inner and outer members, a rotary anti-friction bearing interposed between said members, and a carrier for said bearing comprising a sleeve interposed between and axially of said members and having axially spaced end portions, one rigid with one of said members and the other clear thereof and supporting said bearing, and an axially resilient radially stiff intermediate portion connecting said end portions, said intermediate portion comprising an open fold or return-bend disposed radially of said sleeve.

15. A bearing mounting comprising relatively rotatable inner and outer members, a rotary anti-friction bearing interposed between said members, and a carrier for said bearing comprising a sleeve interposed between said members and having an end portion rigid with one of said members and an end portion clear thereof and supporting said bearing, and an axially resilient intermediate portion connecting said end portions, said axially resilient portion comprising an open fold or return-bend disposed radially of said sleeve, and means for compressing said fold axially of said sleeve to preload said bearing.

16. A bearing mounting comprising relatively rotatable inner and outer members, a rotary anti-friction bearing interposed between said members, and a carrier for said bearing comprising a sleeve interposed between said members and having an end portion rigid with one of said members and an end portion clear thereof and supporting said bearing, and an axially resilient intermediate portion connecting said end portions, said axially resilient portion comprising an open fold or return-bend disposed radially of said sleeve, and means for compressing said fold axially of said sleeve to preload said bearing, the compressive force being transmitted to said fold or return-bend portion of said sleeve through said bearing.

17. A bearing mounting comprising relatively rotatable inner and outer members, a rotary anti-friction bearing interposed between said members, said bearing comprising inner and outer raceway members and antifriction elements disposed therebetween, and a carrier for said bearing comprising a sleeve interposed between said members and having an end portion rigid with one of said members and an end portion clear thereof constituting a seat for one of said raceway members, and an axially resilient intermediate portion connecting said end portions, said axially resilient portion comprising an open fold or return-bend disposed radially of said sleeve, and means for compressing said fold axially of said sleeve to preload said bearing, the compressive force being transmitted to said fold or return-bend through one of the raceway members of said bearing.

18. A bearing mounting comprising relatively rotatable shaft and housing members, a rotary anti-friction bearing interposed between said members, and a carrier for said bearing comprising a sleeve located in said housing member around said shaft member and having an end portion rigid with one of said members and the other end portion clear thereof and forming a seat for said bearing, and an axially resilient intermediate portion connecting said end portions, said axially resilient portion comprising an open fold or return bend extending radially inwardly of said sleeve, the bearing supporting end portion of said sleeve having a longitudinal groove in the periphery thereof and said fold or open return-bend having registering openings extending therethrough longitudinally of said sleeve in line with the bearing seat forming portion thereof, and means for compressing said fold or return-bend axially of said sleeve to thereby preload said bearing.

19. A bearing mounting comprising a housing, a shaft therein, and a rotary antifriction bearing interposed between said shaft and housing, and a carrier for said bearing comprising a sleeve having one end portion rigid with said housing and forming a closure therefor, and the other end portion clear thereof and supporting said bearing therein, and an axially resilient intermediate portion connecting said end portions, said axially resilient portion comprising an open fold or return bend disposed radially of said sleeve, said fold or return bend being compressed axially to thereby preload said bearing.

PAUL KLAMP.